H. M. P. MURPHY.
SPEED RECORDING DEVICE.
APPLICATION FILED APR. 16, 1908.

920,487.

Patented May 4, 1909.

WITNESSES
Wm. M. Cady
J. S. Custer

INVENTOR
Howard M. P. Murphy
By C. Wright
Att'y.

UNITED STATES PATENT OFFICE.

HOWARD M. P. MURPHY, OF PITTSBURG, PENNSYLVANIA.

SPEED-RECORDING DEVICE.

No. 920,487.  Specification of Letters Patent.  Patented May 4, 1909.

Application filed April 16, 1908. Serial No. 427,418.

*To all whom it may concern:*

Be it known that I, HOWARD M. P. MURPHY, a citizen of the United States, residing at Pittsburg, in the county of Allegheny and State of Pennsylvania, have invented new and useful Improvements in Speed-Recording Devices, of which the following is a specification.

This invention relates to speed recording devices, and more particularly for recording the speed of railway or other vehicles.

The principal object of my invention is to provide a simple and accurately operating device for the above purpose, wherein the record made by a single stylus or recording pencil indicates the speed of the vehicle or the number of revolutions during predetermined intervals of time.

Figure 1:
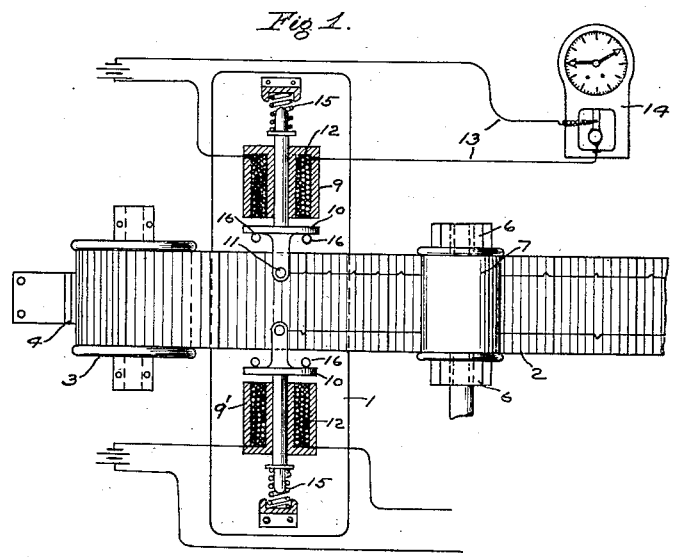
Figure 2:
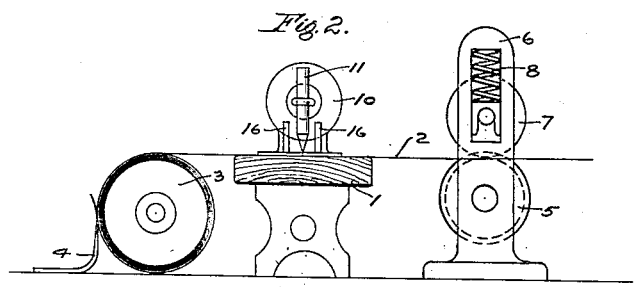

In the accompanying drawing; Figure 1 is a top plan view of a preferred form of my invention; Fig. 2 a side elevation thereof; and Fig. 3 a view illustrating a modified form of record tape.

Broadly considered, my invention comprises a record tape or blank provided with means for moving the same at a rate of speed proportional to the speed of the vehicle or other moving body whose speed record is to be taken, and means for recording predetermined intervals of time on said tape, so that the space or distance between any two of the time marks is proportional to the distance traveled during that interval and by providing a suitable scale on the record tape, having divisions for miles per hour or feet per second or the like, the speed at any time may be read from the tape, without computation.

According to the construction illustrated in the drawing, I provide a recording table 1, over which a record blank or tape 2 is adapted to pass, the record tape being preferably wound on a spool 3 which is pivotally mounted adjacent the table 1 so that the tape unrolls from the spool substantially in the plane of the table. A spring clip 4 may be arranged to press on the spool of tape so as to maintain the tape taut and under a slight tension. On the opposite side of the table 1, a feed roller 5 is pivotally mounted in pedestals 6 and is adapted to bear on the under face of the tape 2. A second roll 7 is pivotally mounted above the tape and is pressed against the tape by suitable springs 8. The feed roller 5 is geared in any desired manner to the vehicle axle or other moving element whose rate of speed is to be recorded so that the same may be caused to rotate at a rate of speed proportional to the speed of the vehicle or other moving body, and thus the tape is moved along by the frictional engagement of the feed roller 5, at a corresponding rate of speed.

Any desired means may be employed for recording intervals of time on the tape, but I preferably provide an electro magnet 9, to the armature 10 of which is secured a stylus or recording pencil 11. The magnet coil 12 of said magnet is arranged in a suitable circuit containing a battery or other source of electric current. The circuit wire 13 thereof is connected to a clock 14 which is adapted to complete the electric circuit through the wire 13 at predetermined intervals of time. A spring 15 tends to force the armature outwardly against stop pins 16.

In operation it will now be apparent that with the vehicle in motion, the tape 2 is moved along at a rate of speed proportional to the vehicle speed, while the stylus 11 records intervals of time, such as seconds or half-seconds, consequently the space or distance on the tape between time records made by the stylus represents the distance traveled in that interval of time. The recording tape, according to my invention, is ruled with divisions of such relation to the speed of the tape and the vehicle that the number of said divisions in a given unit of time as recorded by the time mechanism will indicate the rate of speed of the vehicle. For example, if it is desired to have direct readings of miles per hour, the tape actuating mechanism is geared up to the vehicle in such relation and the divisions are such that the tape progresses one of the divisions thereon for each 1/3600 of a mile actually traveled by the vehicle, the time mechanism being adapted to record second intervals of time on the tape, suppose four divisions are counted between two of the second marks, then the rate of speed during that second of time is 4 miles per hour, since the tape actually shows that the vehicle has traveled 4 times 1/3600 of a mile or 1/900 of a mile in one second, and then the rate per hour would be 3600 times 1/900 of a mile, or 4 miles per hour. In a similar manner the tape may be so ruled as to indicate feet per second, revolutions per minute, or various other unit relations between distance and time, as will be apparent.

I may also provide an additional recording device for making a record at any desired point, as for example at the starting and stopping points of a test. For this purpose I provide an electro-magnet 9' which may be of the same construction as the magnet 9 and connected in circuit with a suitable source of current but adapted to have its circuit closed by an auxiliary device located along the line of travel, for example, and adapted to close the circuit of the magnet 9' at the desired predetermined points.

Figure 3:
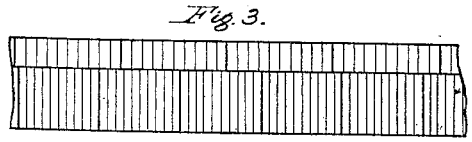

If desired the recording tape may be made as shown in Fig. 3 with two scales which may be arranged, for example, to give a direct reading for both miles per hour traveled and the number of feet per second.

Having now described my invention, what I claim as new and desire to secure by Letters Patent, is:

1. In a device for recording the rate of speed of a vehicle, the combination with a record tape adapted to be operated at a rate of speed proportional to the speed of the vehicle, of means for recording predetermined units of time on the tape, said tape having divisions so related to the speed of the tape and that of the vehicle as to represent units of distance in a given unit of time as recorded by the time recording means, to thereby permit a direct reading of the rate of speed of the vehicle.

2. In a device for recording the rate of speed of a vehicle, the combination with a record tape adapted to be operated at a rate of speed proportional to the speed of the vehicle, of means for recording predetermined units of time on said tape, said tape having divisions so related to the speed of the tape and the vehicle as to represent units of distance in a given unit of time as recorded by the time means, thereby permitting a direct reading of the rate of speed.

3. A device for recording the rate of speed of a vehicle, comprising a tape geared to move at a speed proportional to the speed of the vehicle, a time mechanism for recording seconds of time transitions thereon, said tape having divisions so ruled that the number of divisions between second marks will indicate miles per hour.

4. In a device for recording the speed of a moving element, the combination with a record tape and mechanism for recording intervals of time in units of one denomination thereon, of means operated by the movement of the element for causing said tape to travel at a speed proportional to the speed of said element and distance marks on the tape adapted to indicate units of distance for units of time of a different denomination from those recorded.

In testimony whereof I have hereunto set my hand.

HOWARD M. P. MURPHY.

Witnesses:
R. F. EMERY,
EDITH B. MACDONALD.